United States Patent
Yang

(10) Patent No.: US 11,498,573 B2
(45) Date of Patent: Nov. 15, 2022

(54) PACIFICATION METHOD, APPARATUS, AND SYSTEM BASED ON EMOTION RECOGNITION, COMPUTER DEVICE AND COMPUTER READABLE STORAGE MEDIUM

(71) Applicant: BOE TECHNOLOGY GROUP CO., LTD., Beijing (CN)

(72) Inventor: Xiangdong Yang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 714 days.

(21) Appl. No.: 16/472,012

(22) PCT Filed: Dec. 5, 2018

(86) PCT No.: PCT/CN2018/119384
§ 371 (c)(1),
(2) Date: Jun. 20, 2019

(87) PCT Pub. No.: WO2019/205642
PCT Pub. Date: Oct. 31, 2019

(65) Prior Publication Data
US 2021/0362725 A1 Nov. 25, 2021

(30) Foreign Application Priority Data
Apr. 24, 2018 (CN) .......................... 201810371545.1

(51) Int. Cl.
*B60W 40/08* (2012.01)
*B60W 50/00* (2006.01)
(Continued)

(52) U.S. Cl.
CPC ........ *B60W 40/08* (2013.01); *B60W 50/0098* (2013.01); *G06V 20/593* (2022.01);
(Continued)

(58) Field of Classification Search
None
See application file for complete search history.

(56) References Cited

U.S. PATENT DOCUMENTS

2015/0254955 A1* 9/2015 Fields ................ G06Q 30/0283
340/576
2016/0052394 A1* 2/2016 Yamada ................ G06T 19/006
701/93

FOREIGN PATENT DOCUMENTS

CN 201838333 U 5/2011
CN 102874259 A 1/2013
(Continued)

OTHER PUBLICATIONS

International Search Report and Written Opinion in corresponding International Patent Application No. PCT/CN2018/119384 dated Mar. 4, 2019 (an English translation attached hereto). 15 pages.

*Primary Examiner* — Thomas S McCormack
(74) *Attorney, Agent, or Firm* — Leason Ellis LLP

(57) ABSTRACT

A pacification method based on emotion recognition, includes: acquiring at least one of a voice and an image of a user; determining whether the user has abnormal emotion, according to the at least one of the voice and the image of a user; and in response to the user having abnormal emotion, determining a pacification manner according to the emotion of the user, and performing emotional pacification on the user. An apparatus, a device and a storage medium are also provided.

18 Claims, 3 Drawing Sheets

(51) Int. Cl.
    *G10L 25/63*     (2013.01)
    *H04R 1/32*     (2006.01)
    *G06V 20/59*     (2022.01)
    *G06V 40/20*     (2022.01)
    *G06V 40/16*     (2022.01)

(52) U.S. Cl.
    CPC ............ *G06V 40/174* (2022.01); *G06V 40/20* (2022.01); *G10L 25/63* (2013.01); *H04R 1/326* (2013.01); *B60W 2040/0881* (2013.01); *B60W 2050/0083* (2013.01); *B60W 2540/043* (2020.02); *B60W 2540/21* (2020.02); *B60W 2556/10* (2020.02); *G06V 40/178* (2022.01)

(56) References Cited

FOREIGN PATENT DOCUMENTS

| CN | 203075421 U | 7/2013 |
| CN | 103873512 A | 6/2014 |
| CN | 106803423 A | 6/2017 |
| CN | 107423351 A | 12/2017 |
| CN | 108549720 A | 9/2018 |

\* cited by examiner

PACIFICATION METHOD, APPARATUS, AND SYSTEM BASED ON EMOTION RECOGNITION, COMPUTER DEVICE AND COMPUTER READABLE STORAGE MEDIUM

CROSS REFERENCE

The present application is based on PCT/CN2018/119384, filed on Dec. 5, 2018, which claims the priority of the Chinese Patent Application No. 201810371545.1 filed on Apr. 24, 2018, the entire disclosure thereof is hereby incorporated by reference.

TECHNICAL FIELD

Embodiments of the present disclosure relate to a pacification method, apparatus and system based on emotion recognition, a computer device and a computer readable storage medium.

BACKGROUND

In some scenarios, the user should not have great emotion changes, such as when he/she is driving a car. However, due to various reasons, drivers and other occupants may still inevitably have great emotion changes.

When the driver and other occupants in the car have various emotional changes during the driving process, such as anger, disgust, fear, sadness, etc. If the emotions are not well controlled, it is very likely that some inappropriate actions will be caused by emotions, which may impose safety hazard to the driving.

SUMMARY

According to at least one embodiment of the present disclosure, there is provided a pacification method based on emotion recognition, including: acquiring at least one of a voice and an image of a user; determining whether the user has abnormal emotion, according to the at least one of the voice and the image of a user; and in response to the user having abnormal emotion, determining a pacification manner according to the emotion of the user, and performing emotional pacification on the user.

For example, acquiring at least one of a voice and an image of a user includes: acquiring at least one of a voice and an image of the user and determining a seating position of the user on a vehicle under the acquisition; and in response to the user having abnormal emotion, determining a pacification manner according to the emotion of the user, and performing emotional pacification on the user includes: determining a pacification manner according to the emotion and the seating position of the user, and performing emotional pacification on the user.

For example, determining a pacification manner according to the emotion and the seating position of the user, and performing emotional pacification on the user, includes: acquiring a gender and an age of the user according to the acquired image of the user; and selecting at least one pacification manner to perform emotional pacification on the user according to the emotion, the gender, the age and the seating position of the user.

For example, in response to the user having abnormal emotion, determining a pacification manner according to the emotion of the user, and performing emotional pacification on the user, includes: according to a pacification manner preference set by the user, providing to the user with a pacification manner that matches the pacification manner preference currently set by the user.

For example, in response to the user having abnormal emotion, determining a pacification manner according to the emotion of the user, and performing emotional pacification on the user, includes: in response to the pacification manner being an audio and video entertainment, according to an audio and video entertainment resource preference set by the user, presenting to the user an audio and video entertainment resource that matches the currently set audio and video entertainment resource preference.

For example, the method further includes: sending to a server a user identifier and a pacification preference and/or an audio and video entertainment resource preference set by the user.

For example, the pacification preference and/or the audio and video entertainment resource preference set by the user is acquired according to the user identifier for logging on the vehicle.

For example, selecting at least one pacification manner to perform emotional pacification on the user according to the emotion, the gender, the age and the seating position of the user includes: sending the emotion, the gender, and the age of the user and the seating position of the user to a server; receiving a pacification manner pushed by the server according to a weighted statistics result on ages, genders, and emotional changes of persons in driving positions and non-driving positions during driving processes, and the emotion, the gender, and the age of the current user, and the seating position of the user; and selecting at least one pacification manner to perform emotional pacification on the user from the pacification manner pushed by the server.

For example, acquiring at least one of a voice and an image of a user includes: acquiring a voice feature with a directional microphone on a vehicle, and determining whether the user has abnormal emotion, according to the at least one of the voice and the image of a user, includes: determining whether the user has abnormal emotion by means of emotion recognition with a language feature model, a language dictionary library or an image model trained by deep learning.

For example, the seating position includes a driving position and a non-driving position, and determining a pacification manner according to the emotion and the seating position of the user, and performing emotional pacification on the user, includes: for a user in the driving position, performing pacification in an audio and voice interaction manner; and for a user in the non-driving position, performing pacification in video, audio and voice interaction manners.

For example, for the driving position, a directional microphone, a camera and/or a sound output unit are disposed on a rearview mirror of the vehicle, and the directional microphone, the camera and/or the sound output unit are respectively deployed toward a direction of a side door at either side, for directional acquisition of the voice and the image of the user in the driving position and directional output of voice; and for the non-driving position, a directional microphone, a camera and a sound output unit are disposed above a seat at the non-driving position and at a first angle relative to the non-driving position, for directional acquisition of the voice and the image of the user in the non-driving position and directional output of voice.

According to at least one embodiment of the present disclosure, there is provided a pacification apparatus based on emotion recognition, including: an acquiring device configured to acquire at least one of a voice and an image of a user; a determining device configured to determine whether the user has abnormal emotion, according to the at least one of the voice and the image of a user; and a pacification device configured to, in response to the user having abnormal emotion, determine a pacification manner according to the emotion of the user, and perform emotional pacification on the user.

According to at least one embodiment of the present disclosure, there is provided a pacification system based on emotion recognition, including: a central controller and at least one terminal device, wherein the terminal device is configured to acquire at least one of a voice and an image of a user, send a current emotion of the user to the central controller, and perform emotional pacification on the user according to a pacification manner sent by the central controller; and the central controller is configured to receive the current emotion of the user, which is sent by the terminal device, determine a pacification manner according to the emotion of the user, and send the pacification manner to the terminal device.

For example, the central controller is further configured to: determine a pacification manner according to the emotion of the user, a position of the terminal device that sends the current emotion of the user, and send the pacification manner to the terminal device.

For example, the terminal device is further configured to: determine a gender and an age of the user according to the image of the user and send the gender and the age to the central controller; and the central controller is configured to: select at least one pacification manner according to the emotion, the gender, and the age of the user, and the position of the terminal device that sends the current emotion of the user, and send the at least one pacification manner to the terminal device.

For example, the terminal device is further configured to: receive a pacification manner preference set by the user, and send the pacification manner preference to the central controller; and the central controller determining a pacification manner according to the emotion of the user includes: according to the pacification manner preference set by the user, determining a pacification manner that matches the pacification manner preference currently set by the user.

For example, the terminal device is further configured to: receive an audio and video entertainment resource preference set by the user, and send the audio and video entertainment resource preference to the central controller; and the central controller determining a pacification manner according to the emotion of the user includes: in response to the pacification manner being audio and video entertainment, according to the audio and video entertainment resource preference set by the user, determining an audio and video entertainment resource that matches the currently set audio and video entertainment resource preference.

For example, the central controller determines the audio-visual entertainment resource according to a user identifier and a history record corresponding to the user identification.

According to at least one embodiment of the present disclosure, there is provided a computer device including a processor and a memory, wherein the memory includes instructions executable by the processor to cause the processor to perform the method described above.

According to at least one embodiment of the present disclosure, there is provided a computer readable storage medium having stored thereon computer program instructions which, when executed by a processor, implement the method described above.

BRIEF DESCRIPTION OF THE DRAWINGS

Other features, objects, and advantages of the present application will become more apparent from detailed description of non-limiting embodiments with reference to the following accompanying drawings.

DETAILED DESCRIPTION

Figure 1:
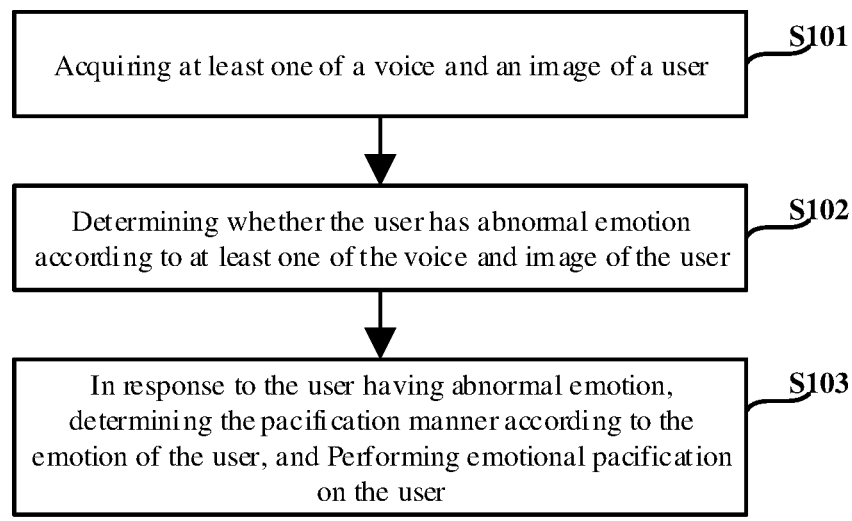
FIG. 1 is a flowchart of a pacification method based on emotion recognition according to an embodiment of the present disclosure.

The present application will be further described in detail below with reference to the accompanying drawings and embodiments. It is understood that the specific embodiments described herein are merely illustrative of the present disclosure, rather than limiting the present disclosure. It should also be noted that, for the convenience of description, only parts related to the present disclosure are shown in the drawings.

It should be noted that the embodiments in the present application and the features in the embodiments may be combined with each other without conflict. The present application will be described in detail below with reference to the accompanying drawings.

Referring to FIG. 1, a pacification method based on emotion recognition according to an embodiment of the present disclosure includes the following steps.

In step S101, a voice and/or an image of a user is acquired.

In step S102, it is determined whether the user has abnormal emotion, according to the voice and/or image of the user.

In step S103, in response to the user having abnormal emotion, a pacification manner is determined according to the emotion of the user, and emotional pacification is performed on the user.

With this method, the emotion of the user can be recognized timely, and the user can be pacified accordingly, so that when the user has an abnormal emotion, the user can be pacified timely to avoid the safety hazard to the driving or other operation when the user is in an abnormal emotion.

In step S101, the image can be directly captured by a camera, the voice can be directly collected from a microphone, or the voice and/or image can be received from other devices via a wired or wireless communication connection.

Further, when the method is applied to a car, the pacification manner can be determined by considering the seating position of the user. In this case, for example, the step S101, acquiring a voice and/or an image of a user includes:

acquiring a voice and/or an image of the user and determining a seating position of the user under the acquisition.

For example, the step S103, in response to the user having abnormal emotion, determining a pacification manner according to the emotion of the user, and performing emotional pacification on the user includes:

determining a pacification manner according to the emotion of the user and the seating position of the user, and performing emotional pacification on the user.

Determining the pacification manner by considering the seating position of the user can distinguish the pacification manners for a driver's seat and a non-driver's seat, and provide more effective pacification to the user. For example, for a user in the driver's seat, it is not appropriate to use a video to pacify him.

It is also possible to further consider the user's gender and age, and select a pacification manner that is more suitable for the user's current gender and age to pacify the user, thereby improving the user's experience. In this case, for example, determining a pacification manner according to the emotion of the user and the seating position of the user, and performing emotional pacification on the user includes:

acquiring an image of a user;

acquiring a gender and an age of the user according to the image of the user; and selecting at least one pacification manner to perform emotional pacification on the user according to the emotion, the gender, and the age of the user and the seating position of the user.

In the embodiment of the present disclosure, the emotion of the user includes, for example, one or a combination of the following:

anger, fatigue, motion sickness, disgust, fear, and sadness.

The pacification manner includes one or a combination of the following:

voice interaction, audio and video entertainment, and broadcasting driving advice.

In order to more effectively perform pacification on the user in a targeted manner, the pacification manner and/or a pacification resource can be further selected according to the user's preference. In this case, the method further includes:

according to a pacification manner preference set by the user, providing to the user with a pacification manner that matches the pacification manner preference currently set by the user, and/or in response to the pacification manner being selected as audio and video entertainment, according to an audio and video entertainment resource preference set by the user, presenting to the user an audio and video entertainment resource that matches the currently set audio and video entertainment resource preference.

When the user is riding, the user can log in manually or log in by means of face recognition. According to the user identifier logged in, the pacification manner preference and/or audio and video entertainment resource preference that the user has set can be acquired, to provide more targeted service for the user.

Further, after receiving the pacification manner preference and/or the audio and video entertainment resource preference set by the user, the user identifier and the pacification manner preference and/or the audio and video entertainment resource preference set by the user can be sent to a cloud server, for the cloud server to perform storage and statistical calculation. When a user who has not set a preference needs to be pacified, the cloud server can push a pacification content suitable for the user according to the statistical data and the gender and age of the user, and the like.

In this case, for example, selecting at least one pacification manner to perform emotional pacification on the user according to the emotion, the gender, and the age of the user and the seating position of the user includes:

sending the emotion, the gender, and the age of the user and the seating position of the user to a cloud server;

receiving a pacification manner pushed by the cloud server according to a weighted statistics result on ages, genders, and emotional changes of persons in driving positions and non-driving positions during driving processes, and the emotion, the gender, and the age of the current user, and the seating position of the user; and selecting at least one pacification manner to perform emotional pacification on the user from the pacification manner pushed by the cloud server.

It should be noted that although the operations of the disclosed methods are described in a particular order in the accompanying drawings, this is not required or suggested that the operations must be performed in that particular order, or that all of the operations shown must be performed to achieve the desired results. Instead, the steps depicted in the flowcharts can be performed in a changed order. Additionally or alternatively, certain steps can be skipped, some steps can be combined into one step, and/or one step can be broken down into multiple steps.

For a scenario applied in a car, or when applied to other scenarios with multiple users, at least one terminal device and one central controller can be provided, thereby saving hardware costs. The terminal device can be disposed at a position corresponding to the user, and configured to capture audio and video and perform pacification. The central controller can be configured to determine the pacification manner and pacification resource. The central controller is for example a server.

Figure 2:
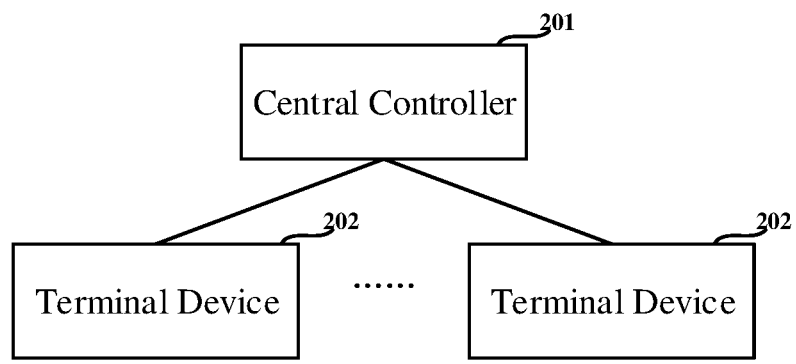
FIG. 2 is a schematic structural diagram of a pacification system based on emotion recognition according to an embodiment of the present disclosure.

For example, as shown in FIG. 2, an embodiment of the present disclosure further provides a pacification system based on emotion recognition, including: a central controller 201 and at least one terminal device 202, for example.

The terminal device 202 is configured to acquire the voice and/or image of the user, determine whether the user currently has abnormal emotion according to the voice and/or image of the user, send the current emotion of the user to the central controller, and perform emotional pacification on the user according to a pacification manner sent by the central controller.

The central controller 201 is configured to receive a current emotion of the user, which is sent by the terminal device, determine a pacification manner according to the emotion of the user, and send the pacification manner to the terminal device.

Further, for example, the central controller 201 is configured to:

determine a pacification manner according to the emotion of the user, the position of the terminal device 202 that sends the current emotion of the user, and send the pacification manner to the terminal device 202.

Further, the terminal device 202 is further configured to:

acquire an image of the user; and determine a gender and an age of the user according to the image of the user and send the gender and the age to the central controller 201.

For example, the central controller 201 is configured to select at least one pacification manner according to the emotion, the gender, and the age of the user, and the position of the terminal device 202 that sends the current emotion of the user, and send the at least one pacification manner to the terminal device 202.

Generally, the emotion of the users include, for example, one or a combination of the following:

anger, fatigue, motion sickness, disgust, fear, and sadness.

The pacification manner includes one or a combination of the following:

voice interaction, audio and video entertainment, and broadcasting driving advice.

Further, the terminal device 202 is further configured to:

receive a pacification manner preference and/or an audio and video entertainment resource preference set by the user, and send the same to the central controller 201.

For example, the central controller 201 determining the pacification manner according to the emotion of the user includes:

according to a pacification manner preference set by the user, determining a pacification manner that matches the pacification manner preference currently set by the user, and/or in response to the pacification manner being selected as audio and video entertainment, according to an audio and video entertainment resource preference set by the user, preparing an audio and video entertainment resource that matches the currently set audio and video entertainment resource preference.

Figure 3:
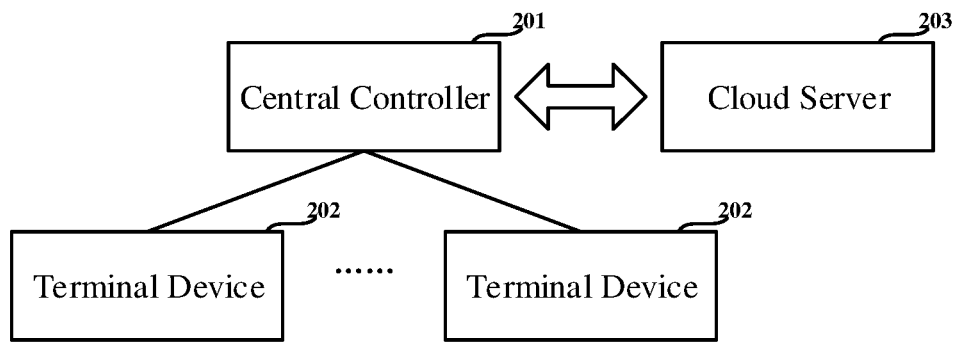
FIG. 3 is a schematic structural diagram of a pacification system based on emotion recognition with a cloud server according to an embodiment of the present disclosure.

Further, as shown in FIG. 3, the system further includes a cloud server 203.

The central controller 201 is further configured to:

send the user identification and the pacification manner preference and/or the audio and video entertainment resource preference set by the user to the cloud server 203.

Further, for example, the central controller 201 determining the pacification manner according to the emotion of the user includes:

sending the emotion, the gender, and the age of the user, and the seating position of the user to the cloud server 203; and receiving the pacification manner pushed by the cloud server 203, and selecting at least one pacification manner from the pacification manner pushed by the cloud server 203.

The cloud server 203 is configured to receive the emotion, the gender, and the age of the user, and the seating position of the user, which are sent by the central controller 201, determine at least one pacification manner according to a weighted statistics result on ages, genders, and emotional changes of persons in driving positions and non-driving positions during driving processes, and the emotion, the gender, and the age of the current user, and the seating position of the user, and push the at least one pacification manner to the central controller 201.

For example, in an embodiment of the present disclosure, for example, applied to a car, terminal devices that perform audio and video capture and pacification can be disposed at positions of corresponding seats in the vehicle. Each terminal device is connected to the central controller by a wire or wirelessly. The central controller is responsible for determining a pacification manner, a pacification resource, and interacting with the cloud server. The central controller can also be responsible for emotion recognition based on voice and/or image. It is also possible to provide devices capable of fully implementing the pacification method based on emotion recognition in the positions of the corresponding seats in the vehicle, and each of the devices can independently complete the emotional recognition and perform pacification on the user corresponding to the seat.

When terminal devices and a central controller are employed, by the terminal devices deployed at the respective seating positions, directional voice feature can be extracted. For example, the influence of the background voice on the voice feature of the corresponding position can be avoided, and the corresponding voice feature can be used for emotion recognition with a language model that has been subject to deep learning and migration learning training, to recognize emotions of anger, disgust, fear, and sadness. For example, voice feature can be acquired with directional microphones deployed at respective positions and used for emotion recognition with a language model that has been subject to deep learning and migration learning training, to recognize emotions of anger, disgust, fear, and sadness of an occupant in a corresponding position. The recognition result is sent to the central controller.

By means of visual recognition performed in the terminal device, the image model of deep learning and migration learning training can also be used for emotion recognition to recognize emotions such as anger, disgust, fear, and sadness.

By means of the visual recognition performed in the terminal device, the age range and the gender of the occupant in the corresponding position can also be recognized. For example, according to the camera deployed at each seating position, the facial features of the occupant can be extracted. Based on the face recognition model, the age range and the gender can be recognized, and the corresponding recognition result can be transmitted to the central controller.

The central controller determines the pacification manner according to the emotion recognition result and the visual recognition result, and pushes the pacification resource at the local end and at the cloud server to the corresponding terminal device, for the terminal device to present the same to the user for pacification. For example, according to the seating position ID, the type of emotion, the age range and the gender of the rider, preparation is made for the pacification manner, and the pacification resource at the local end and at the cloud server end is pushed to an emotional pacification module at the seating position.

When determining the pacification manner, the central controller can perform emotional management on the positions of the users in the vehicle to determine whether to use the pacification manner corresponding to the emotional change. The emotional management focuses on different aspects for the driving position and the non-driving position in the management process. For the driving position, the focus is put on fatigue, fear, anger sentiment caused by road rage, and for the non-driving position, it is more important to put the focus on sickness of the non-driving passengers and the angry emotions generated before the ride and affecting the driver's driving safety.

The pacification manner of each terminal device is generated according to self-definition or acquiring preferences. The pacification manner can be implemented by means of audio and video playback or voice suggestion.

Figure 4:
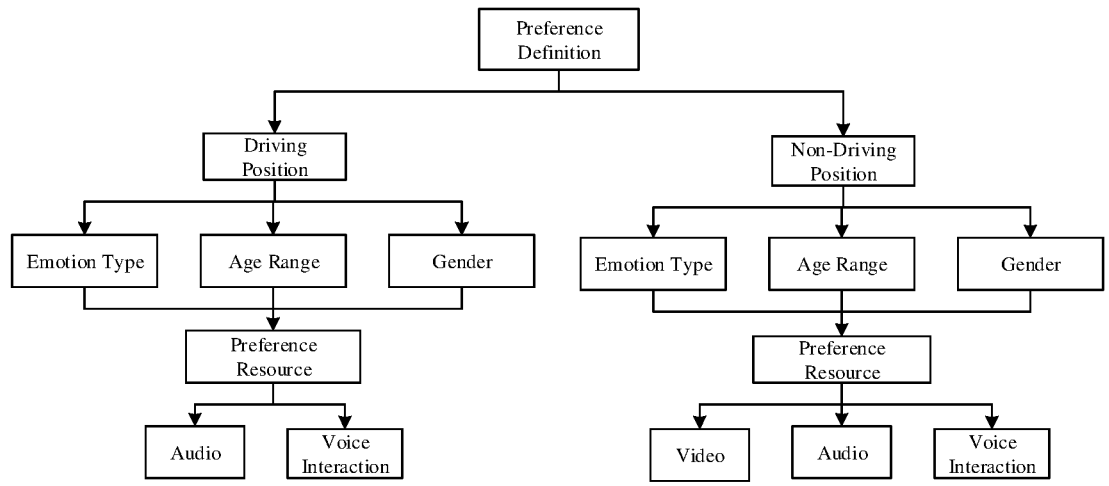
FIG. 4 is a schematic diagram of a data structure defined by a preference according to an embodiment of the present disclosure.

The terminal device also provides a preference definition interface for the passengers at the positions, and in the preference definition, resources can be selected according to four categories of emotions: anger, disgust, fear, and sadness. The resources can be defined as preferences according to a resource management list for emotion pacification in the cloud server and the resource self-definition manner. The data structure for defining preference is shown in FIG. 4.

When performing emotional pacification, the pushed emotional pacification manner can be implemented by the terminal devices deployed in the seating positions. For example, in the driving position, emotion pacification can be performed according to the user's preference data in the driving position. In this position, only a pacification manner of audio and voice interaction can be provided. For example, the voice interaction includes human-computer interaction and voice interaction with a remote person. For the non-driving positions, video, audio and voice interaction manners can be provided.

The central controller can further send the user preference collected by each terminal device to the cloud server. The central controller can also perform weighted statistics on ages, genders, and emotional changes of persons in driving positions and non-driving positions during driving processes, perform pacification manner and deploy the preference resource at the local end for the pacification manner. Thus, when performing pacification on a user, the user can be pacified in a targeted manner.

The cloud server mainly performs data analysis and data management. The data management creates a database of correspondence among emotion types, pacification manners, and pacification resources respectively for the driving position and the non-driving position in the vehicle, performs data analysis according to the interaction data about the preferences of the occupants. In the analysis process, the pacification manners and the pacification resources are analyzed according to dimensions of the number of riding times, the emotion type at a seating position, the gender and the age range, to realize automated selection of the pacification manner.

For the terminal device, the arrangement of the directional microphone, the camera, the sound output unit, and the video output unit can be as follows.

For the main driving and the co-pilot positions, a directional microphone, a camera, and a sound output unit can be disposed on the rearview mirrors, and two sets of directional microphones, cameras, and sound output units on the rearview mirrors are respectively deployed toward the direction of the side doors at either side, for directional acquisition of voice, image and directional output of voice.

For the positions of the back seats, the directional microphones, cameras and sound output units can be deployed at a 30-degree angle centered on the corresponding positions directly above the seats, for directional voice acquisition, image acquisition and directional voice output of the passengers in the back seats.

For a back seat, a video output unit can be deployed on the back of the corresponding front seat.

The microphone, the camera, the sound output unit, and the video output unit complete the corresponding functions by independent hardware processing modules. The microphone, the camera, the sound output unit, and the video output unit can send data to the central controller through a serial port, and the sound output unit and the video output unit can receive audio and video data in the pacification manner transmitted by the central controller, through the network port. The central controller can be combined with the central control system of the in-vehicle system to implement management of the terminal devices, management of the pacification manners, and management of the preferences of resources, and establish data routing between each terminal device and the cloud server.

Each terminal device performs language feature extraction with a directional voice collection module at each location, and performs emotion recognition with a voice emotion recognition model deployed in each terminal device. Each terminal device performs face recognition of the occupant with a visual recognition module, and recognizes the age and the gender of the passengers at each position. The terminal device can transmit the voice and emotion recognition and visual recognition results to the central controller.

Each occupant can set a pacification manner preference on the corresponding terminal device, and the terminal device sends the set pacification manner preference to the central controller. The central controller performs resource application to the cloud server and resource synchronization with the cloud server. The central controller is configured to determine the pacification manner and the pacification resource according to the voice and emotion recognition and visual recognition results and the user preferences, and send the pacification manner and the pacification resource to the terminal device.

Figure 5:
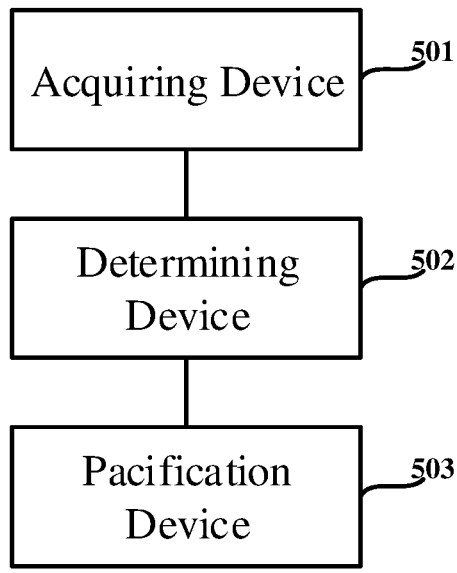
FIG. 5 is a schematic structural diagram of a pacification apparatus based on emotion recognition according to an embodiment of the present disclosure.

An embodiment of the present disclosure further provides an apparatus for pacification based on emotion recognition, and the pacification apparatus corresponds to the aforementioned pacification method. For a specific embodiment, reference can be made to the embodiment of the aforementioned pacification method. As shown in FIG. 5, the apparatus includes:

an acquiring device 501 configured to acquire a voice and/or an image of a user;

a determining device 502 configured to determine whether the user has abnormal emotion, according to the voice and/or image of the user; and a pacification device 503 configured to, in response to the user having abnormal emotion, determine a pacification manner according to the emotion of the user, and perform emotional pacification on the user.

The above units can be implemented by software or by hardware. For example, a unit or a module in the embodiments of the present disclosure can be implemented by a general purpose processor or a dedicated processor, for example, a central processing unit, or a programmable logic circuit.

Further, for example, the acquiring device 501 is configured to:

acquire a voice and/or an image of the user and determine a seating position of the user under the acquisition.

For example, the pacification device 503 is configured to:

determine a pacification manner according to the emotion of the user and the seating position of the user, and perform emotional pacification on the user.

For example, the pacification device 503 determining the pacification manner according to the emotion of the user and the seating position of the user, and performing emotional pacification on the user includes:

acquiring an image of a user;

acquiring a gender and an age of the user according to the image of the user;

and selecting at least one pacification manner to perform emotional pacification on the user according to the emotion, the gender, and the age of the user and the seating position of the user.

Generally, the emotion of the user includes, for example, one or a combination of the following:

anger, fatigue, motion sickness, disgust, fear, and sadness.

The pacification manner includes one or a combination of the following:

voice interaction, audio and video entertainment, and broadcasting driving advice.

Further, the pacification device 503 is also configured to:

according to a pacification manner preference set by the user, provide to the user with a pacification manner that matches the pacification manner preference currently set by the user, and/or in response to the pacification manner being selected as audio and video entertainment, according to an audio and video entertainment resource preference set by the user, present to the user an audio and video entertainment resource that matches the currently set audio and video entertainment resource preference.

Further, the pacification device 503 is also configured to:

send to the cloud server the user identifier and a pacification preference and/or an audio and video entertainment resource preference set by the user.

Further, for example, the pacification device 503 selecting at least one pacification manner to perform emotional pacification on the user according to the emotion, the gender, and the age of the user and the seating position of the user, includes:

sending the emotion, the gender, and the age of the user and the seating position of the user to a cloud server;

receiving a pacification manner pushed by the cloud server according to a weighted statistics result on ages, genders, and emotional changes of persons in driving positions and non-driving positions during driving processes, and the emotion, the gender, and the age of the current user, and the seating position of the user; and selecting at least one pacification manner to perform emotional pacification on the user from the pacification manner pushed by the cloud server.

It should be understood that the units or modules recited in the apparatus correspond to the various steps in the method described with reference to FIG. 1. Thus, the operations and features described above for the method are equally applicable to the apparatus and the contained units, for example, details of which will not be repeated herein. The apparatus can be implemented in a browser or other security application of an electronic device in advance, or can be loaded into a browser or a secure application of the electronic device by downloading or the like. Corresponding units in the apparatus can cooperate with units in the electronic device to implement the solution of the embodiments of the present application.

Figure 6:
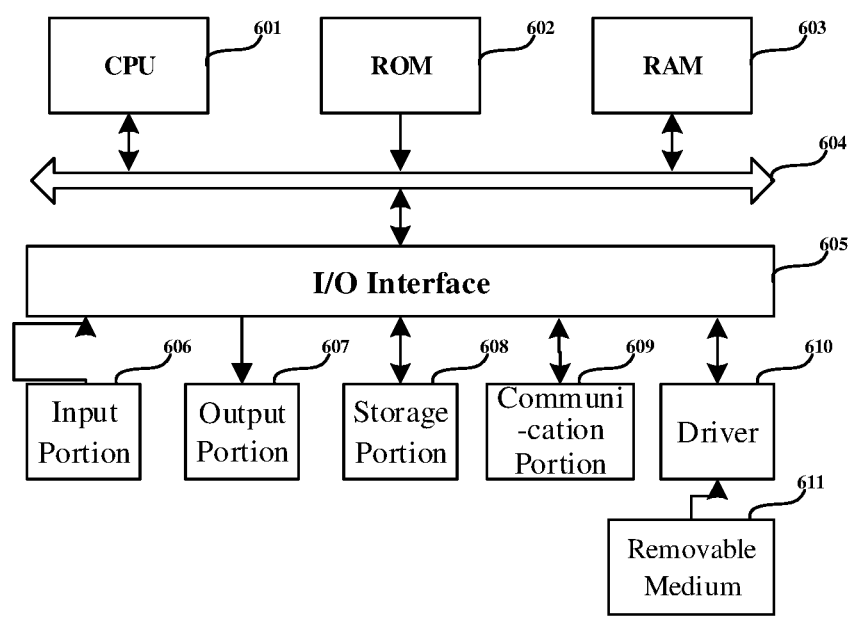
FIG. 6 is a schematic structural diagram of a pacification device based on emotion recognition according to an embodiment of the present disclosure.

Referring to FIG. 6, there is shown a schematic structural diagram of a computer system suitable for implementing a pacification device based on emotion recognition according to the embodiment of the present application, which can be, for example, a terminal device or a central controller, or can be, for example, a device that is combined by a terminal device and a central controller.

As shown in FIG. 6, the computer system includes a central processing unit (CPU) 601, which can perform various desired action and processing according to a program stored in a read only memory (ROM) 602 or a program loaded from a storage portion 608 into a random access memory (RAM) 603. In the RAM 603, various programs and data required for system operation are also stored. The CPU 601, the ROM 602, and the RAM 603 are connected to each other through a bus 604. An input/output (I/O) interface 605 is also coupled to a bus 604.

The following components are connected to the I/O interface 605: an input portion 606 including a keyboard, a mouse, and the like; an output portion 607 including, for example, a cathode ray tube (CRT), a liquid crystal display (LCD), a speaker, and the like; a storage portion 608 including a hard disk or the like; and a communication portion 609 including a network interface card such as a LAN card, a modem, or the like. The communication section 609 performs communication processing via a network such as the Internet. A driver 610 is also connected to the I/O interface 605 as needed. A removable medium 611, such as a magnetic disk, an optical disk, a magneto-optical disk, a semiconductor memory or the like, is mounted on the drive 610 as needed so that a computer program read therefrom is installed into the storage portion 608 as needed.

For example, to reduce hardware costs, the central controller can also omit the input portion 606 and the output portion 607.

In particular, according to an embodiment of the present disclosure, the process described above with reference to FIG. 1 can be implemented as a computer software program. For example, an embodiment of the present disclosure includes a computer program product including a computer program tangibly embodied on a machine readable medium. The computer program includes program codes for performing the method of FIG. 1. In such an embodiment, the computer program can be downloaded and installed from the network via the communication portion 609, and/or installed from the removable medium 611.

The flowchart and block diagrams in the accompanying drawings illustrate the architecture, functionality, and operation of possible implementations of the system, the method, and the computer program product in accordance with various embodiments of the present disclosure. In this regard, each block of the flowchart or block diagrams can represent a module, a program segment, or a portion of code that includes one or more logic for implementing the executable instructions of specified functions. It should also be noted that in some alternative implementations, the functions noted in the blocks can also occur in a different order than that illustrated in the drawings. For example, two successively represented blocks can in fact be executed substantially in parallel, and they can sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or operation, or it can be implemented by a combination of dedicated hardware and computer instructions.

The units or modules described in the embodiments of the present application can be implemented by software or by hardware. The described units or modules can also be provided in a processor, for example, as a processor including an XX unit, a YY unit, and a ZZ unit. For example, the names of these units or modules do not in some cases constitute a limitation on the units or modules per se. For example, the XX unit can also be described as "a unit for XX."

In another aspect, the present application further provides a computer readable storage medium, which can be a computer readable storage medium included in the apparatus described in the foregoing embodiment, or can be a computer readable storage medium that exists separately and is not assembled into a device. The computer readable storage medium stores one or more programs that are used by one or more processors to perform the formula input methods described in this application.

The above description is only a preferred embodiment of the present disclosure and a description of the technical principles applied. It should be understood by those skilled in the art that the scope of the present disclosure referred to in the present disclosure is not limited to the specific combination of the above technical features, and should also cover other technical solutions formed by any combination of the above technical features or equivalent features thereof without departing from the inventive concept, for example, a technical solution formed by replacing the above features with but not limited to, the technical features having similar functions, as disclosed in the present disclosure.

The present application claims the priority of the Chinese Patent Application No. 201810371545.1 filed on Apr. 24, 2018, the entire disclosure of which is hereby incorporated by reference.

What is claimed is:

1. A pacification method based on emotion recognition, comprising:
   acquiring at least one of a voice and an image of a user;
   determining whether the user has abnormal emotion, according to the at least one of the voice and the image of a user; and
   in response to the user having abnormal emotion, determining a pacification manner according to the emotion of the user, and performing emotional pacification on the user;
   wherein acquiring at least one of a voice and an image of a user comprises:
   acquiring at least one of a voice and an image of the user and determining a seating position of the user on a vehicle under the acquisition; and
   in response to the user having abnormal emotion, determining a pacification manner according to the emotion of the user, and performing emotional pacification on the user comprises:
   determining a pacification manner according to the emotion and the seating position of the user, and performing emotional pacification on the user.

2. The method according to claim 1, wherein determining a pacification manner according to the emotion and the seating position of the user, and performing emotional pacification on the user, comprises:
   acquiring a gender and an age of the user according to the acquired image of the user; and
   selecting at least one pacification manner to perform emotional pacification on the user according to the emotion, the gender, the age and the seating position of the user.

3. The method according to claim 1, wherein in response to the user having abnormal emotion, determining a pacification manner according to the emotion of the user, and performing emotional pacification on the user, comprises:
   according to a pacification manner preference set by the user, providing to the user with a pacification manner that matches the pacification manner preference currently set by the user.

4. The method according to claim 1, wherein in response to the user having abnormal emotion, determining a pacification manner according to the emotion of the user, and performing emotional pacification on the user, comprises:
   in response to the pacification manner being an audio and video entertainment, according to an audio and video entertainment resource preference set by the user, presenting to the user an audio and video entertainment resource that matches the currently set audio and video entertainment resource preference.

5. The method according to claim 3, further comprising:
   sending to a server a user identifier and at least one of a pacification preference and an audio and video entertainment resource preference set by the user.

6. The method according to claim 5, wherein at least one of the pacification preference and the audio and video entertainment resource preference set by the user is acquired according to the user identifier for logging on the vehicle.

7. The method according to claim 2, wherein selecting at least one pacification manner to perform emotional pacification on the user according to the emotion, the gender, the age and the seating position of the user comprises:
   sending the emotion, the gender, and the age of the user and the seating position of the user to a server;
   receiving a pacification manner pushed by the server according to a weighted statistics result on ages, genders, and emotional changes of persons in driving positions and non-driving positions during driving processes, and the emotion, the gender, and the age of the current user, and the seating position of the user; and
   selecting at least one pacification manner to perform emotional pacification on the user from the pacification manner pushed by the server.

8. The method according to claim 1, wherein
   acquiring at least one of a voice and an image of a user further comprises:
   acquiring a voice feature with a directional microphone on a vehicle, and
   determining whether the user has abnormal emotion, according to the at least one of the voice and the image of a user, comprises:
   determining whether the user has abnormal emotion by means of emotion recognition with a language feature model, a language dictionary library or an image model trained by deep learning.

9. The method according to claim 1, wherein the seating position comprises a driving position and a non-driving position, and
   determining a pacification manner according to the emotion and the seating position of the user, and performing emotional pacification on the user, comprises:
   for a user in the driving position, performing pacification in an audio and voice interaction manner; and
   for a user in the non-driving position, performing pacification in video, audio and voice interaction manners.

10. The method according to claim 9, wherein
    for the driving position, at least one of a directional microphone, a camera and a sound output unit is disposed on a rearview mirror of the vehicle, and at least one of the directional microphone, the camera and the sound output unit is deployed toward a direction of a side door at either side, for directional acquisition of the voice and the image of the user in the driving position and directional output of voice; and
    for the non-driving position, a directional microphone, a camera and a sound output unit are disposed above a seat at the non-driving position and at a first angle relative to the non-driving position, for directional acquisition of the voice and the image of the user in the non-driving position and directional output of voice.

11. A pacification apparatus based on emotion recognition, comprising:
    an acquiring device configured to acquire at least one of a voice and an image of a user;
    a determining device configured to determine whether the user has abnormal emotion, according to the at least one of the voice and the image of a user; and
    a pacification device configured to, in response to the user having abnormal emotion, determine a pacification manner according to the emotion of the user, and perform emotional pacification on the user;

wherein the acquiring device is further configured to:
acquire at least one of a voice and an image of the user and determining a seating position of the user on a vehicle under the acquisition; and
in response to the user having abnormal emotion, determine a pacification manner according to the emotion of the user, and performing emotional pacification on the user comprises:
determine a pacification manner according to the emotion and the seating position of the user, and performing emotional pacification on the user.

12. A pacification system based on emotion recognition, comprising: a central controller and at least one terminal device, wherein
the terminal device is configured to acquire at least one of a voice and an image of a user, send a current emotion of the user to the central controller, and perform emotional pacification on the user according to a pacification manner sent by the central controller; and
the central controller is configured to receive the current emotion of the user, which is sent by the terminal device, determine a pacification manner according to the emotion of the user, and send the pacification manner to the terminal device;
wherein the central controller is further configured to:
determine a pacification manner according to the emotion of the user, a position of the terminal device that sends the current emotion of the user, and send the pacification manner to the terminal device.

13. The system according to claim 12, wherein the terminal device is further configured to:
determine a gender and an age of the user according to the image of the user and send the gender and the age to the central controller; and
the central controller is configured to:
select at least one pacification manner according to the emotion, the gender, and the age of the user, and the position of the terminal device that sends the current emotion of the user, and send the at least one pacification manner to the terminal device.

14. The system according to claim 12, wherein the terminal device is further configured to:
receive a pacification manner preference set by the user, and send the pacification manner preference to the central controller; and
the central controller determining a pacification manner according to the emotion of the user comprises:
according to the pacification manner preference set by the user, determining a pacification manner that matches the pacification manner preference currently set by the user.

15. The system according to claim 12, wherein the terminal device is further configured to:
receive an audio and video entertainment resource preference set by the user, and send the audio and video entertainment resource preference to the central controller; and
the central controller determining a pacification manner according to the emotion of the user comprises:
in response to the pacification manner being audio and video entertainment, according to the audio and video entertainment resource preference set by the user, determining an audio and video entertainment resource that matches the currently set audio and video entertainment resource preference.

16. The system according to claim 15, wherein the central controller determines the audiovisual entertainment resource according to a user identifier and a history record corresponding to the user identification.

17. A computer device comprising a processor and a memory, wherein the memory comprises instructions executable by the processor to cause the processor to perform the method according to claim 1.

18. A non-transitory computer readable storage medium having stored thereon computer program instructions which, when executed by a processor, implement the method according to claim 1.

* * * * *